Sept. 4, 1951          H. C. OTIS          2,566,776
SAFETY FLOW CONTROL DEVICE
Filed Jan. 8, 1949
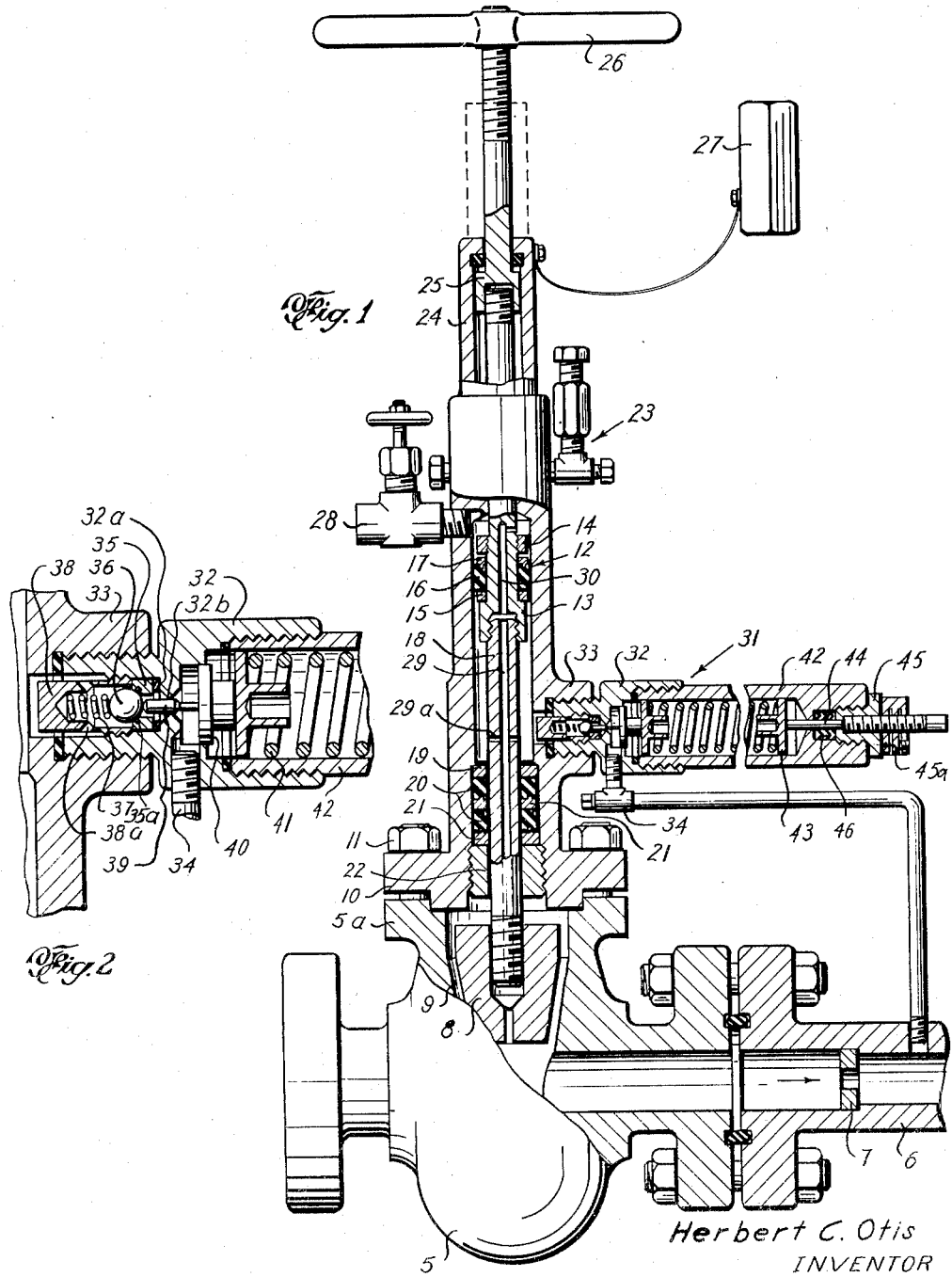
Herbert C. Otis
INVENTOR
BY Browning & Simms
ATTORNEYS Patented Sept. 4, 1951

2,566,776

UNITED STATES PATENT OFFICE 2,566,776

SAFETY FLOW CONTROL DEVICE

Herbert C. Otis, Dallas, Tex.

Application January 8, 1949, Serial No. 69,870

5 Claims. (Cl. 137—153)

This invention relates to improvements in surface safety control devices and refers more particularly to apparatus adapted for use as an automatic close off for a flow conduit when a predetermined flow condition occurs in the conduit.

In the present day off-shore drilling operations, it frequently becomes necessary to transport fluids from producing wells to the mainland through conduits. Surface safety control devices are used in such conduits to protect against breakage of the conduit and loss of fluid in the event of a pipe line break. It is desirable to use devices that are actuated by the pressure of the fluids transported. It is obviously desirable that in a surface safety control valve used over the water, particularly where substances such as oil or the like are to be transported, that the operation of such devices shall not involve a venting or discharge of fluid into the water.

An object of this invention is to provide a surface safety control device which is actuated by the pressure fluid to be controlled and which will be effective to close the conduit upon occurrence of predetermined flow conditions within the conduit.

A further object is to provide a surface safety control device which will not discharge fluids into the atmosphere upon actuation thereof.

Another object is to provide a surface safety control device of the character described that may be installed in a flow conduit immediately adjacent the source of fluid to be transported.

Still another object is to provide a surface safety control device adapted to automatically close off a conduit when the rate of fluid flow through the conduit falls below a predetermined value wherein the fluid controlled provides the power medium for actuating the device.

A still further object is to provide a mechanism adaptable for closing valves controlling flow through conduits wherein the fluid controlled provides the actuating power for the mechanism.

Other and further objects of this invention will appear from the description.

In the accompanying drawings which form a part of the instant specification and are to be read in conjunction therewith, and wherein like reference numerals are employed to designate like parts in the various views:

Fig. 1 is a vertical cross-sectional view of a device embodying this invention; and Fig. 2 is a fragmentary sectional view upon an enlarged scale illustrating the control valve mechanism of the device shown in Fig. 1.

Referring to the drawings, there is shown at 5 a valve body adapted to be connected in a conduit and which may be secured to a flow fitting 6 having disposed therein a flow restrictor 7. The valve may be of the gate type 8 adapted to seat in a wedge type seat 9 when in a lowered position within the body and adapted to offer substantially no resistance to flow through the body when in the raised position shown in the drawings. This particular valve is shown by way of illustration only and not by way of limitation, and it is contemplated that any conventional valve may be employed which has a valve member that is positively moved from opened to closed position.

The valve body has an upper flange 5—a to which may be secured a bonnet 10 providing a housing for a fluid operated mechanism for closing the valve. Bonnet 10 has a flange at its lower end corresponding to flange 5—a adapted to receive fastener elements 11 for holding the bonnet secured in sealed relation with the valve body.

The interior of bonnet 10 provides a pressure chamber for housing a pressure responsive member shown generally at 12 which may constitute a piston reciprocally mounted within the cylindrical housing. This piston divides the interior of the housing into two variable capacity pressure compartments. The piston may be made up of a mandrel 13 having a reduced diameter portion which provides an external shoulder against which a packing assembly may be secured by a nut 14 threaded thereto. A suitable packing assembly may include a washer 15, a lip type seal element 16 and a spacer washer 17 for holding the lips of the element apart so that the pressure within the upper compartment, when greater than that within the lower compartment, will hold the lips expanded against the mandrel and the cylindrical wall of the housing.

The piston has an actuating connection with valve member 8 in the form of rod or stem 18 threaded at one end to mandrel 13 and at the other end to the valve member. The stem extends from the lower end of the bonnet and through a stuffing box carried by the bonnet for providing a sliding seal. This stuffing box includes a washer 19 abutting an internal shoulder found in the housing for backing up suitable stuffing material which may be a series of lip type seal elements 20 having their lips held open by spacers 21. A gland nut 22, threaded in the lower end of the bonnet, holds the assembly in position. This stuffing box arrangement is not made up tight for the pressure to be held is relied upon to expand the lips of elements 20 to provide the seal and the elements are not held under compression by the gland nut 22. This particular arrangement is preferred because of its substantially frictionless characteristics but other stuffing box arrangements may be employed.

Mandrel 13 provides a part of the stem and has an extension leading upwardly through a seal assembly which may be any conventional seal assembly such as, for instance, a plastic packing type arrangement wherein the plastic packing is charged to sealing position through a fitting 23. The upper end of the mandrel resides within a cap 24 and is threaded to an extension 25 which extends exteriorly of the cap. This cap 24 and extension 25 provide a means for slowing down the speed of closure of the main valve, which in practice is often so fast that valve body 5 is damaged by the impact of valve member 8 against its seat. To effect this slow down of closure, the enlarged head of extension 25 has an outer diameter with respect to the inner diameter of the cap 24 as to effect a sliding fit. A suitable fluid, as for example that used in automotive hydraulic brake systems, may be placed within cap 24 to provide a dash pot effect retarding speed of operation of the valve.

The extension 25 has a threaded end externally of cap 24 for receiving a hand tool 26 which, taken with the spacer element 27, provides a means for manually opening the main valve element. A manually controlled valve 28 is provided to vent the upper compartment of the pressure chamber to facilitate opening of the main valve.

A means is provided for pressurizing both of the pressure compartments of the pressure chamber with fluid from the conduit upstream from restrictor 7. This may include connections communicating between the compartments and the conduit in the form of an axial passage 29 in stem 18 which communicates with the interior of the valve body. A radial passage 29—a communicates between the pressure compartment beneath the piston and passage 29 when the pressure responsive member is in the position shown but is blocked off to break this connection upon slight movement of the pressure responsive member downwardly to bring the radial passage within the uppermost of seals 20. The upper pressure compartment communicates with passage 29 through passage 30 extending axially of mandrel 13 and having a radial portion at its upper end.

In order to actuate the main valve, a means is supplied for creating a pressure differential across pressure responsive member 12 upon occurrence of a predetermined flow condition within the conduit. This means comprises a connection between the pressure compartment to be relieved and the conduit to be controlled at a point downstream from the flow restrictor 7. This connection is controlled by a relief valve which is actuated in response to the pressure differential between the compartment and the conduit on the low pressure side of the restrictor.

In the embodiment shown, the pressure relief valve is indicated generally at 31 and includes a nipple 32 threaded into a socket 33 carried by the bonnet. This socket has a port which communicates with the lower compartment of the bonnet. Nipple 32 has a lateral port in which one end of pipe 34 is connected. The other end of pipe 34 is connected in the flow fitting 6 on the low pressure side of restrictor 7. It will be understood that with this pressure relief valve 31 open, the low pressure compartment will communicate with the low pressure part of the conduit controlled, to create a pressure differential across the pressure responsive member or piston 12. However, with valve 31 closed and with the piston 12 in its raised position, the pressure in the two compartments of the pressure chamber will be equal.

Referring to the details of the preferred relief valve 31, the arrangement is such that the connection between the compartment and the conduit contains a seat 35 against which a valve element, as ball 36, is urged by the pressure differential thereacross. The seat may carry a resilient seal element 35—a. A resilient means is provided for constantly urging valve member 36 toward unseated position with a predetermined force. With this arrangement, when the flow within the conduit falls below a predetermined rate, the pressure drop across restrictor 7 will be so small as to permit unseating of valve 36 to relieve the pressure on the underside of piston 12.

Preferably, the relief valve should be of the snap action type which, upon occurrence of a slight leak past the valve member, will snap to full open position and permit rapid venting or reduction in pressure within the lower pressure compartment. To accomplish this, valve 36 is held against seat 35 by a weak spring 37 secured to a retainer element 38. The retainer element has a recess within which the valve member and spring reside and is threaded interiorly of nipple 32. The retainer has a reduced diameter portion extending into the port. Pressure fluid from the pressure compartment beneath the piston passes through the annular space encircling the end of the retainer and passages 38—a into the interior recess of the retainer. This retainer also holds seat 35 against shoulder 32—a internally of the nipple.

The passage through the nipple has a restricted portion 32—b which is substantially blocked by the head 39 of the unseating means. The head 39 engages valve member 36 and is connected by a small diameter neck portion with an element 40. This element 40 is engaged by a resilient element or spring 41 and is urged thereby in a direction to unseat the valve member. The large head 39 substantially blocks the constriction 32—b so that on slight unseating of valve 36, the pressure differential thereacross is substantially equalized. Head 39 having a smaller diameter than the diameter of the seat for valve 36, the force resisting opening of the relief valve is materially reduced and spring 41 urges valve 36 to full open position with a snap action. In this full open position, the narrow neck portion securing head 39 to element 40 resides within the constricted portion of the passage. The annular opening thus provided has sufficient area to rapidly vent the lower pressure compartment and should be considerably greater than the area of opening 29—a.

Spring 41 may have an adjustable mounting within case 42 so that the tension of the spring may be varied to afford an adjustment for the setting of the relief valve. This adjustment may be provided by securing the end of the spring remote from the valve to stop 43. This stop is carried by a stem 44 extending from the end of case 42 through a packing gland nut 45. Packing material 46 is compressed between the nut 45 and internal shoulder formed on case 42. Stem 44 is threaded to nut 45 and has a noncircular end portion for receiving a tool to facilitate rotation thereof to advance or retract stop 43 within the casing. The stem may be locked in adjusted position by lock nut 45—a.

It is believed that the operation of the device of this invention is apparent from the foregoing description. The main valve member 8 has an actuating connection with the pressure responsive member or piston 12 and the pressure chamber is supplied with the same pressure on both sides of the piston. This pressure comes from the interior of the valve body which resides upstream from restrictor 7. Inasmuch as flow fitting 6 is located downstream from the valve body, the device may be secured either directly to a well head, pressure vessel or the like, or closely adjacent thereto, to protect substantially the entire length of the conduit.

When the flow through the conduit is such as to produce a predetermined pressure drop across the restrictor 7, means is provided for relieving the pressure from the compartment on the underside of the piston 12 so as to move the piston toward valve closing direction and the main valve element is forced to seated position. In the assembly of this invention, as it is shown, this latter occurs when the pressure drop across the restrictor falls below a predetermined value as, for instance, when the conduit downstream from the safety device becomes obstructed as by freezing up of the conduit or associated outlet equipment.

The reduction of pressure within the lower pressure compartment of the chamber, interiorly of bonnet 10, occurs when the force of spring 41, which may be adjusted to any predetermined tension, overcomes the force of the pressure differential between the compartment to be relieved and the conduit on the low pressure side of the restrictor 7 acting against the valve member 36 across the area of the seat ring 35—a. The relief valve 31 preferably is of a snap action type as, for instance, the ones shown in the drawings, so that the actuating mechanism will be positively actuated to close the main valve. Upon slight unseating of valve member 36, the pressure across the member substantially equalizes, and when this occurs, the only force resisting spring 41 is the force of the pressure differential across head 39. Inasmuch as the effective area of head 39 is less than the effective area of valve member 36, this force is less than the force that spring 41 has already overcome and the spring is effective to force the valve member 36 to full open position with a snap action. When this occurs, the annular space between the constricted portion of the port shown at 32—b and the narrow neck which joins head 39 to element 40 provides a passage of greater cross-sectional area than the area of port 29—a whereby the pressure within the lower compartment of the pressure chamber is quickly reduced to that on the low pressure side of restrictor 7. This creates a pressure differential across piston 12 driving it in a direction to close the main valve member 8.

When it is desired to open the valve, valve 28 is opened, hand tool 26 is moved to the end of extension 25 and spacer 27 is placed in its dotted line position. Hand tool 26 is then rotated and due to its threaded connection to extension 25, the extension is raised pulling piston 12 to its raised position, and main valve member 8 to its raised or open position. Stem 44 is then backed off, to relieve the tension of spring 41, so that weak spring 37 will seat valve 36. Then valve 28 is closed, spacer 27 is removed, hand tool 26 is raised to its upper position on the end of extension 25, and the relief valve 31 is again set by adjusting the axial position of stem 44. During this resetting of the relief valve, lock nut 45—a is not disturbed and insures a resetting of the valve with the same spring tension as before. Of course, if desired, lock nut 45—a may be adjusted to a new selected position axially of stem 44 to change the tension on spring 41 so that the main valve will be closed upon occurrence of a different flow condition within conduit fitting 6.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In combination a conduit, a valve disposed in the conduit with a valve member adapted to control flow through the conduit and pressure actuated means for closing the valve including a housing having a chamber with a pressure responsive member therein dividing it into two pressure compartments, a drive connection between the pressure responsive member and valve member for shifting the latter in response to movement of the pressure responsive member, and means for providing a pressure differential across the pressure responsive member for actuating same upon occurrence of predetermined flow conditions within the conduit, said latter means including a flow restrictor in the conduit, connections for supplying pressure fluid from the conduit on the upstream side of the restrictor to the two pressure compartments and a relief valve for one of the compartments mounted to place it in communication with the conduit downstream of the restrictor, said relief valve responsive to the pressure differential between the pressure compartment to be relieved and the conduit on the downstream side of the restrictor and adapted to open upon occurrence of a predetermined differential, and means closing off communication between the relief valve and connection for pressurizing the compartment with which the relief valve is connected when the valve member is shifted to closed position.

2. Pressure actuated mechanism adaptable for use in conjunction with a valve for controlling flow through a conduit, comprising a housing with a cylindrical chamber therein, a piston mounted for reciprocation within the chamber, an actuating rod connected to the piston and extending from the chamber with a sliding seal between the housing and rod, a flow fitting with a flow restrictor therein, said fitting adapted to be connected in a conduit to form a part of the flow passage, passages communicating with the chamber on both sides of the piston and adapted to be connected to the flow fitting upstream of the restrictor, a port in the housing located to communicate with the chamber only on one side of the piston, a connection between the port and the flow fitting downstream of the restrictor, and a pressure responsive relief valve controlling said connection and adapted to open upon occurrence of a predetermined flow condition across the restrictor, and means including the sliding seal interrupting communication between the port and passages for pressurizing the piston, when the piston is in closed position.

3. The mechanism of claim 2 wherein the relief valve is of the type adapted to open when the pressure differential thereacross falls below a predetermined amount.

4. In combination a conduit with a flow restrictor means therein, a valve having a valve member for controlling flow through the conduit, a pressure actuated mechanism for closing the valve including a pressure responsive member having a drive connection with the valve member, means subjecting the pressure responsive member on both its sides to the pressure upstream of the restrictor means, a vent means connected to the conduit downstream of the flow restrictor means for relieving the pressure on the side of the pressure responsive member to cause closing of the valve member, a snap action pilot relief valve controlling the vent means and responsive to the pressure differential across the relief valve, whereby the valve will be closed in response to the pressure drop across the flow restrictor means which is a function of the velocity of flow through the conduit, and means for closing that portion of the second mentioned means which pressurizes the side of the pressure responsive member with which the vent is associated when the valve member is shifted to closed position.

5. In combination a valve having a valve member, a flow fitting with a flow restrictor therein, both the valve and fitting being adapted to be disposed in a common conduit, a pressure actuated mechanism for closing the valve including a pressure responsive member having a drive connection with the valve member, means subjecting the pressure responsive member on both its sides to the pressure upstream of the restrictor, a vent means communicating with the fitting so as to reflect the pressure downstream of the restrictor for relieving the pressure on the side of the pressure responsive member to cause closing of the valve member, a snap action pilot relief valve controlling the vent means and responsive to the pressure differential across the relief valve, whereby the valve will be closed in response to the pressure differential across the flow restrictor which will be a function of the velocity of flow through the restrictor, and means discontinuing communication between the vent and first mentioned means when the valve member is shifted to closed position.

HERBERT C. OTIS.

REFERENCES CITED

The following references are of record in the file of this patent:

UNITED STATES PATENTS

| Number | Name | Date |
| --- | --- | --- |
| 901,222 | Anderson | Oct. 13, 1908 |
| 1,155,076 | Melcher | Dec. 31, 1940 |
| 2,227,297 | Coy | Dec. 31, 1940 |

FOREIGN PATENTS

| Number | Country | Date |
| --- | --- | --- |
| 132,119 | Switzerland | June 1, 1929 |